United States Patent [19]

Kimmel

[11] 4,223,374
[45] Sep. 16, 1980

[54] LIGHT TRANSMITTING STRUCTURE

[76] Inventor: Peter S. Kimmel, .5608 Vernon Pl., Bethesda, Md. 20034

[21] Appl. No.: 944,148

[22] Filed: Sep. 20, 1978

[51] Int. Cl.² .............................................. F21V 7.04
[52] U.S. Cl. ........................................ 362/31; 362/32
[58] Field of Search ....................... 362/351, 354–356, 362/31, 32, , 121–123, 147–150; 350/258–265, 96.10

[56] References Cited

U.S. PATENT DOCUMENTS

| | | | |
|---|---|---|---|
| 3,018,362 | 1/1962 | Joyce | 362/32 |
| 3,048,694 | 8/1962 | Faulk | 363/31 |
| 4,012,630 | 3/1977 | Gareis | 362/32 |

FOREIGN PATENT DOCUMENTS

| | | | |
|---|---|---|---|
| 838733 | 5/1952 | Fed. Rep. of Germany | 362/31 |
| 256113 | 2/1949 | Switzerland | 362/31 |

OTHER PUBLICATIONS

"Trilogy Illuminated Ceiling Systems", brochure Published by Neo-Ray Lighting Systems, Inc., Mar. 1978.

*Primary Examiner*—John Gonzales

[57] ABSTRACT

A light transmitting structure is invented that transmits light through panels or other light conducting materials with specially treated edges passing through an opaque surface. Because at least some of the panels are transparent, and because the panels are of varying dimensions, light is seen not only on the specially treated edges of the panels, but also through other panels and as external reflections between the panels, thereby creating a decorative, dynamic, specular lighting pattern and functional illumination in a structure that can be integrated into an architectural module having application to such places as restaurants, shopping centers, night clubs and formal corridors. The structure can serve as either major or secondary sources of room illumination, or even as a light sculpture. It can also be used with low energy utilization light sources.

17 Claims, 11 Drawing Figures

LIGHT TRANSMITTING STRUCTURE

BACKGROUND OF THE DISCLOSURE

Light transmitting materials which are able to conduct light are known. Generally, light will enter the material through any polished edge. Once within the material, the light will reflect internally on any polished edge, and will be emitted through any roughened edge. By controlling the degree to which the edges are polished or roughened, one can control how the light will behave.

While the aforementioned properties have been used to either direct light, provide a general light, or to provide a decorative, glittering effect, the possible advantages of combining all three properties into one light transmitting structure have not been explored. In other words, the art has not adequately combined a light structure that is sculptural, decorative and glittering, while still being functional enough to provide a primary source of light. Furthermore, the art has not provided a structure that is dynamic, i.e., a structure that reflects light in different directions as the viewer's position changes. In addition, the art has not provided such a structure that can also employ low energy sources of illumination. For example, one of the lowest energy sources of artificial illumination is fluorescent light, yet because of fluorescent sources' diffuse distribution properties, it is difficult to integrate them within a sculptural, decorative and glittering structure.

OBJECTS OF THE DISCLOSURE

One object of the invention is to provide a structure for both decorative, specular dynamic ambient illumination and functional illumination. Another object of the invention is to provide a structure which can serve as major task illumination or as supplemental illumination in areas where a special type of ambient lighting is architecturally desired to create an effect, such as in restaurants, dining areas, night clubs, elevators, shopping centers, malls and stores. Another object of the invention is to provide such a structure with adequate flexibility so that the structure can be used with either natural or any type of artificial illumination, so as to enable light to be provided using minimal energy. It is a further object of the invention to integrate the structure with a source of natural light, thereby creating a sculptural lighting effect without use of power. An additional object of the invention is to integrate the structure with low energy illumination sources such as fluorescent lights. Still another object of the invention is to integrate a plurality of such structures in a modular architectural grid for use in suspended ceilings and other applications Still other objects and advantages of the invention will become apparent to those skilled in the art upon reference to the following description and accompanying drawings.

SUMMARY OF THE DISCLOSURE

The objects of the invention are attained by providing a light transmitting structure for use with a light source, with said structure comprised of at least one opaque sheet of a rigid material having a light source side and a light emitting side, and a plurality of separate light transmitting elements passing through at least one of said opaque sheets. A first portion of each light transmitting element is flush with or protrudes beyond the light source side of each said opaque sheet with light transmitting elements, and a second portion of each element protrudes beyond the light emitting side of said sheet. A plurality of said light transmitting elements have transparent faces. The said first portions have at least one polished edge and any number of roughened edges, and the said second portions have at least one roughened edge and any number of polished edges. A plurality of said second portions are of varying dimensions so that a line of sight exists which passes through both a transparent face of at least one element and a roughened edge of at least one other element behind said face.

The light transmitting elements are preferably perpendicular to each opaque sheet with said elements at their intersections. The elements are preferably flat panels, although they may be polyhedrons containing at least four sides. They are usually of an acrylic plastic such as methyl acrylate. The elements may be clear or of any color. The transparent faces may have a pattern in them so that the pattern is also illuminated. A colored transparent sheet may be positioned between the said first portions and the light source.

Each opaque sheet may contain at least one void so that light passes through the voids as well as through the light transmitting elements.

The structure comprises an opaque housing attached to the opaque sheet in a light-tight manner with means inside the housing to contain at least one light source. The structure may also be integrated within a suspended ceiling that serves as the opaque sheet, with means above said ceiling for containing at least one light source.

The faces of the panels are preferably polished so that external reflections of light emitted from the roughened edges occur between the said faces of varying dimensions. When so polished, said external reflections will alter their positions as an observer alters his or her position with respect to the overall structure.

All of these variations are within the scope of the invention.

The invention has widespread application in certain architectural facilities, including, but not limited to: restaurants, night clubs, dining areas, elevators, shopping centers, malls and stores.

DETAILED DESCRIPTION OF THE DISCLOSURE

The invention is described in greater detail below with reference to the appended drawings, of which.

Definitions.

All shapes of light transmitting elements contain at least one face and one edge. On elements with continuous, curved surfaces, such as those of cones and cylinders, edges are defined to be the surfaces closest to a plane parallel to the opaque sheet. Faces are defined to be the surfaces closest to a plane perpendicular to the opaque sheet. On all other shapes of elements, the surfaces with the largest surface areas are faces, and those with the smallest surface areas are edges.

Figure 1:
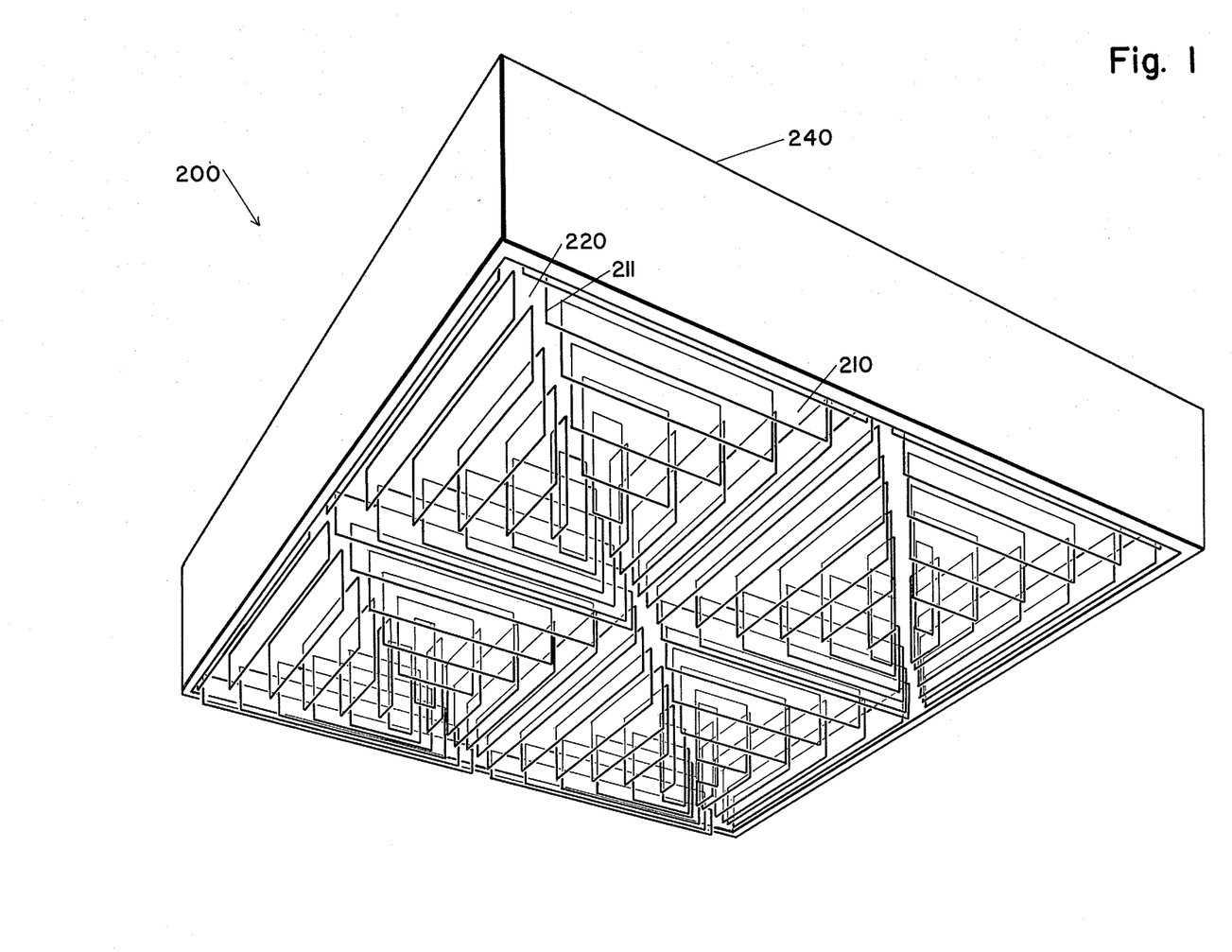
FIG. 1 is a diagrammatic view in perspective of one embodiment of the invention, illustrating the light emitting side of the overall structure encased in a housing.

In FIG. 1, the overall structure 200 contains light transmitting transparent panels 210, an opaque sheet 220, and is encased in an opaque housing 240. The structure, in this embodiment, is suspended from a ceiling by means not shown. In other embodiments (see FIG. 5), the panels may be of any shape. Similarly, the housing may be of any shape. In this diagrammatic view, the edges 211 of the panels are shown as lines only with no thickness. The thicknesses of the panels of this embodiment are shown in FIG. 2.

Figure 2:
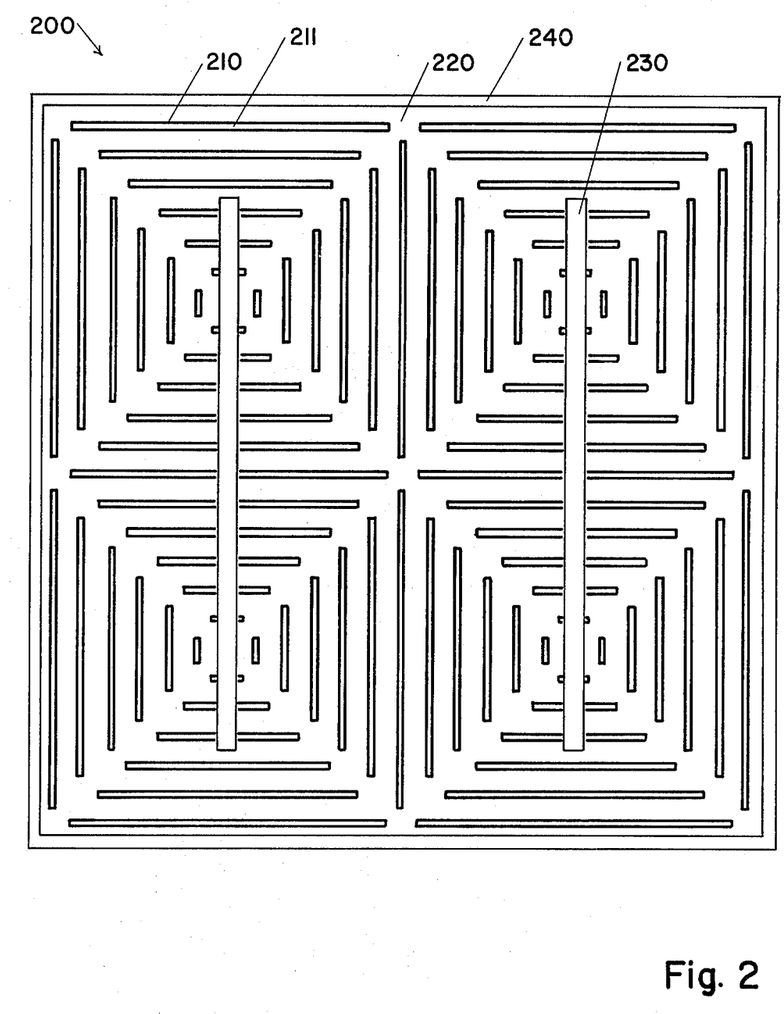
FIG. 2 is a plan view of the light transmitting side of the structure shown in FIG. 1.

In FIG. 2, a plan view of the top of the same embodiment shown in FIG. 1, the overall structure 200 contains the light transmitting panels 210 and an opaque sheet 220. Except on the top, the structure is encased by an opaque housing 240 which also contains a light source 230. In this view, the edges 211 of the panels can be more readily seen. The light source, although shown as an integral part of the overall structure, may also be separate from the structure (see FIGS. 6 and 7). There may be any number of light sources, and each may be of any shape, color or type of light. For example, although a fluorescent light source is shown in this embodiment, spotlights and incandescent bulbs are some of the other types of light sources that may be used with the invention. In all embodiments, the opaque sheet is the primary shield between the viewer and light source. Light transmitting elements protrude through both sides of the sheet. There does not have to be any material between these elements and the light source. However, in other embodiments, there may be clear or colored transparent material between the elements and the light source, although such material will absorb some of the light energy and reduce the amount of light entering the elements.

Figure 6:
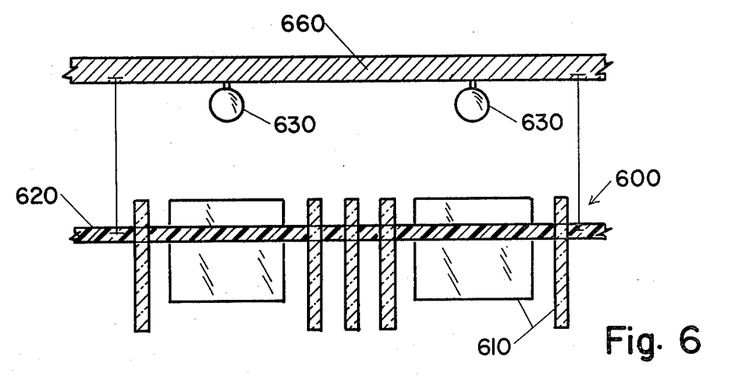
FIG. 6 shows a partial section of another embodiment of the invention where the structure is integrated in a suspended ceiling.
Figure 7:
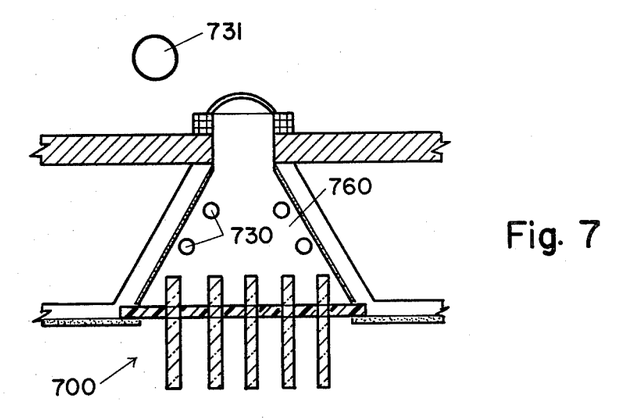
FIG. 7 shows a section of another embodiment of the invention where the overall structure is integrated with a skylight well.

The housing 240, together with the opaque sheet 220, enclose the light source in such a way so that no direct light can be seen from normal viewing angles except light transmitted through the light transmitting elements 210. Although the housing shape may vary, the enclosure characteristics must remain. The housing does not totally enclose the light source since it is open on top, thereby enabling indirect light to be reflected from the ceiling. Some openings in the housing, not shown, are always necessary so that heat generated by the light source can be dissipated. Other types of housings are shown in FIGS. 6 and 7.

The overall structure 200, in other embodiments not shown, can be any shape (polyhedronal or curved, regular or irregular), although regular shapes are best suited to repeated use, such as when the structure is integrated with a modular ceiling. Although primarily intended as a device to be suspended from a ceiling, the structure can be situated on any plane (see FIG. 5).

Figure 3:
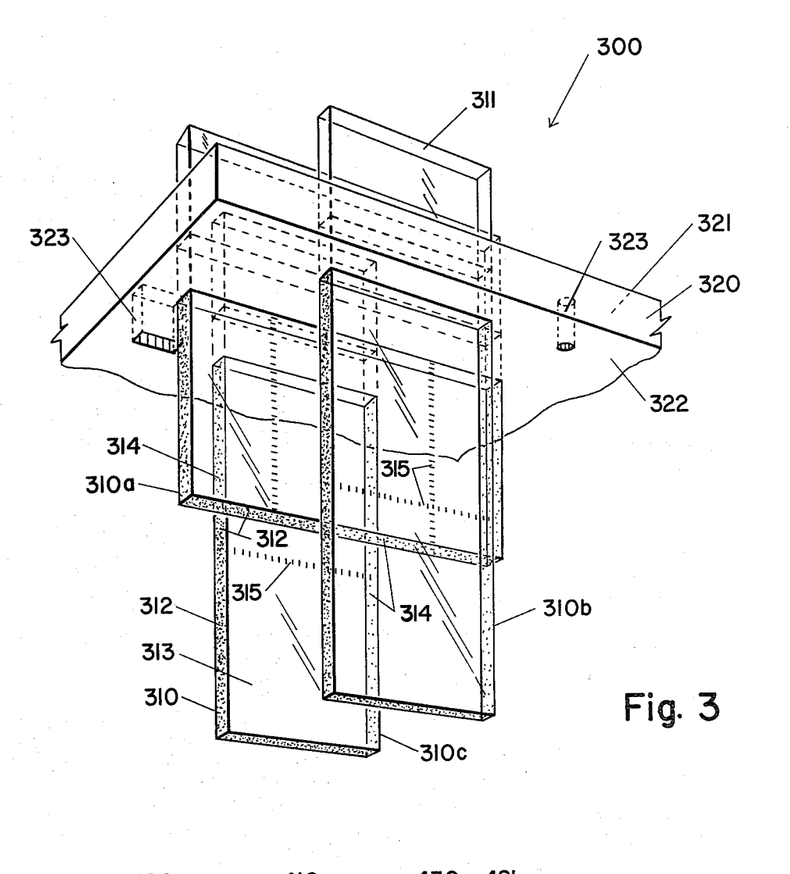
FIG. 3 is a perspective view of part of the overall structure of another embodiment, and shows in detail the characteristics of the non-electrical features of the invention.
Figure 5:
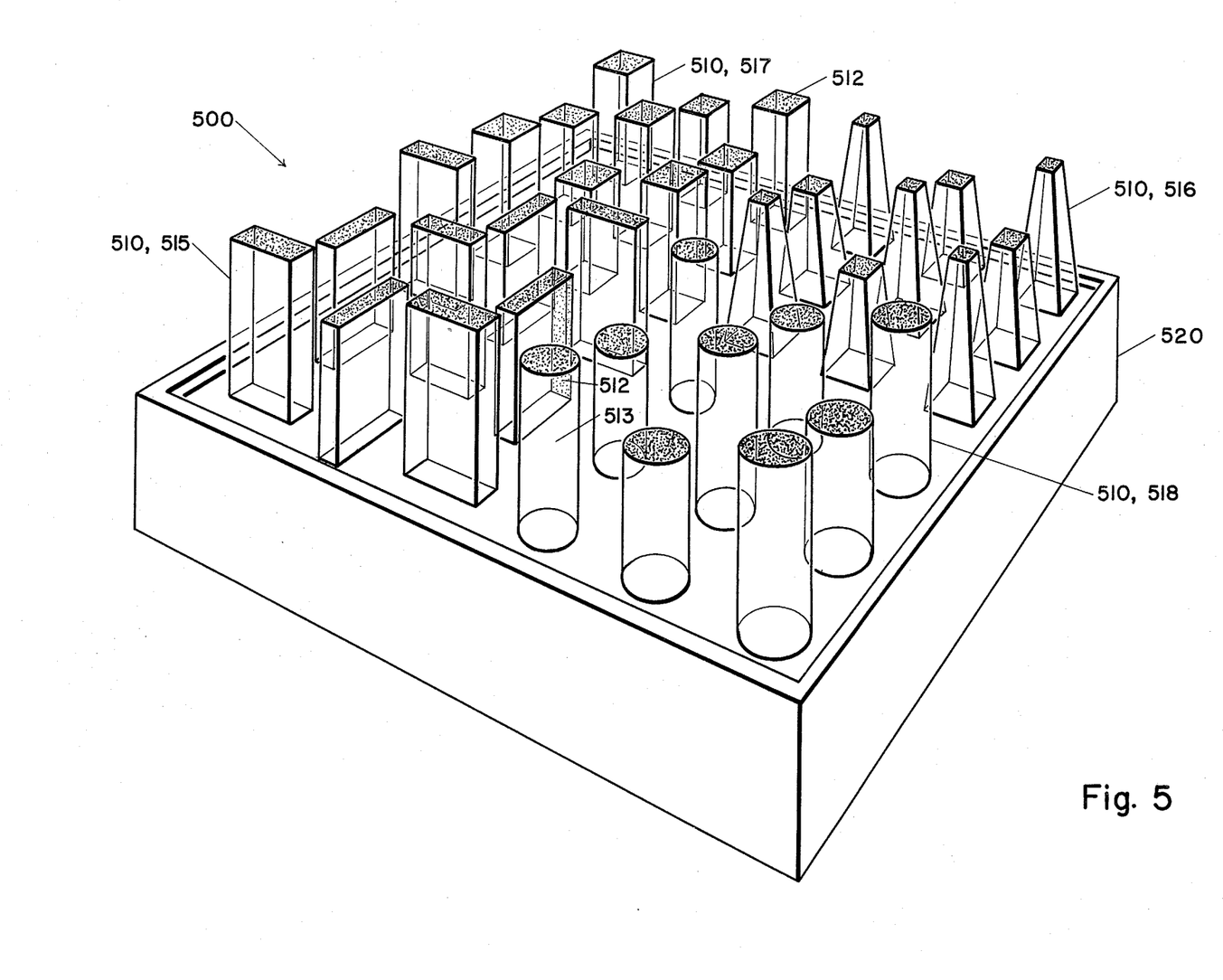
FIG. 5 is a perspective view of still another embodiment with alternative uses and arrangements of light transmitting elements.

In FIG. 3, showing another embodiment of the invention, panels 310 are employed as the light transmitting elements to demonstrate some of the detailed characteristics of the invention. Other shaped elements may also be used, as shown in FIG. 5. The light transmitting material is preferably an acrylic plastic such as methyl acrylate. In all embodiments, at least one polished edge 311 of the light transmitting elements is exposed to the light source side 321 of the opaque sheet 320 so that a means of light entry into the elements is provided. The remaining edges of each light transmitting element exposed to the light source side of the opaque sheet may be polished or roughened, but it is preferable that they be polished so that light may enter them. At least one roughened edge 312 of the light transmitting elements protrudes through to the light emitting side of the opaque sheet. The remaining edges of each light transmitting element on the light emitting side of the opaque sheet may be roughened or polished. The roughened edges are where most of the light entering the elements is emitted. Each element protruding through the opaque sheet does not have to protrude through either side of the sheet the same amount as a neighboring element. At least two of the elements protruding through any opaque sheet must be of different dimensions so that the desired effects that follow can be attained.

In all embodiments some of the faces 313 of the light transmitting elements 310 are transparent so that the illuminated edges of other elements 314 may be observed through them since the elements that protrude through the opaque sheet 320 are of varying dimensions. In FIG. 3, the illuminated edge 314 of one panel (310a or 310c) can be seen through the transparent face of another panel (310b or 310a, respectively). This further enhances the specular effect created by the structure. The effect may be controlled by controlling which edges are polished and which are roughened. When the faces are also highly polished, and since the elements on the light emitting side 322 of the opaque sheet are of varying dimensions, external reflections 315 of the roughened edges 312 occur between the faces and still further enhance the specular effect. As an observer changes his or her viewing position with respect to the overall structure, the external reflections on the faces will change their relative positions. This makes the overall structure dynamic, i.e., it will appear different from every viewing angle. For example, as a viewer's eye level is raised, the horizontal reflection 315 on the face 310c furthest from the viewer, said reflection caused by the light from the roughened edge 312 of face 310a, will move up, and the one 315 on the face 310b closest the viewer will move down. These effects will occur when the overall structure is higher than the viewer's eye level. The opposite will occur if the structure is lower than the viewer's eye level, or if the viewer's eye level is lowered. Similar effects will occur with any vertical reflections as the viewer's eye moves to the right or left. When the effects of the reflections are thusly controlled, the light transmitting elements may appear to have one pattern when viewed from one angle, but a very different pattern when viewed from a different angle. As a viewer moves between the angles, both patterns may be observed.

Slightly different results will occur when some of the faces are treated with a reflective coating. By varying the amounts through which the elements 310 pass through either side of the opaque sheet 320, one also controls the amount of light emitted from the elements. The further the roughened edge 312 is from the light source (not shown), the less light will be emitted. The more the polished edge 311 protrudes through the light source side 321 of the sheet, the more light there will be entering the elements.

Each light transmitting elements's face 313 may contain a design (not shown) incorporated onto it so that light may also be emitted in this manner through the faces. The design on each face may or may not be integrated with the design on other faces of other elements. Of course, as shown in this embodiment, there is no design on the faces, so that all light is emitted through the roughened edges 312 of the elements 310.

In different embodiments, the opaque sheet 320 can be any size, color, reflectivity, finish or shape (flat or curved, regular or irregular), depending on its precise application. The inner 321 and outer 322 surfaces of the sheet do not have to be treated identically. For example, the outer surface may be dark so that it does not detract from the light emitted through the roughened edges 312 of the light transmitting elements 310, while the inner surface may be light so that it can reflect incident light back toward the light source and other room surfaces, creating a general indirect light around the structure 300 and in the overall space. Of course, by placing the structure appropriately in a space, it is possible to eliminate all light except light emitted through the roughened edges of the light transmitting elements (see FIG. 6).

The opaque sheet 320 may contain voids 323 so that some of the light can penetrate directly through the sheet as well as through the light transmitting elements 310.

Figure 4:
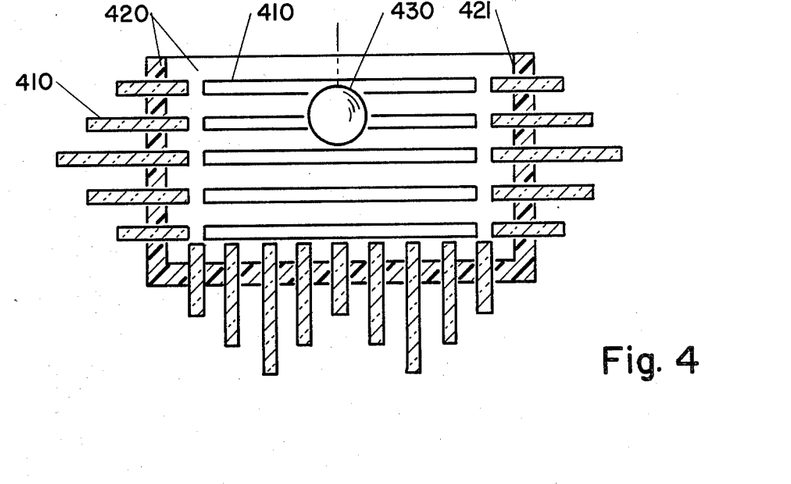
FIG. 4 shows a section of another embodiment of the invention showing how the invention can be applied on several different planes.

In FIG. 4, showing still another embodiment, the opaque sheets 420 are on fives sides (right, left, bottom, rear; and the front is not shown) surrounding the light source 430. The location of the sheets has no restriction except that they be between any intended viewer and the light source. The light transmitting elements 410 protrude through both sides of the opaque sheets in varying amounts. In all embodiments containing more than one opaque sheet, at least one of the sheets must contain a plurality of light transmitting elements. In some embodiments (not shown) some of the light transmitting elements may be flush with the inner edge 421 of the opaque sheet.

In FIG. 5, the overall structure 500 is a fountain of light, situated on a horizontal surface below eye level.

FIG. 5 shows four different shapes and arrangements of the light transmitting elements 510: flat panels 515, truncated tetrahedrons 516, cubes 517 and cylindrical rods 518. The elements, in other embodiments, may be any thickness, color or shape (polyhedronal or curved, regular or irregular), as long as the previously described properties are satisfied. Similarly, the roughened edges 512, in other embodiments not shown, may be any shape (flat, beveled, curved or sawtoothed; regular or irregular), as long as at least one edge of each light transmitting element can emit light received from the light source. The light source is not visible in this embodiment; it is located behind the opaque sheet 520. The light source may be positioned similarly to the light source shown in FIG. 2. Each edge does not have to be finished the same way as a similar edge on a different element. Similarly, each element does not have to have the same properties. Of course, some elements do not have to transmit light, but it is preferable that most of them do. The elements may be arranged in any pattern, regular or irregular. Any element may touch another, or may protrude independently through the opaque sheet. Of course, at least two elements should protrude through each opaque sheet so that the effects previously described in FIG. 3 of external reflections between elements, or of being able to see the illuminated edges 512 of one element through the face 513 of at least one other element are still preserved.

In all embodiments, it is preferred that each light transmitting element 510 is perpendicular to the opaque sheet 520 at their intersection.

FIG. 6 shows an embodiment of the invention where the light source 630 is not an integral part of the overall structure 600. Here, the light sources are mounted from the primary ceiling 660 directly over the structure. In this embodiment, the overall structure is integrated within a suspended ceiling system containing light transmitting elements 610 protruding through an opaque sheet 620; the suspended ceiling serves as the opaque sheet.

FIG. 7 shows another embodiment where the light transmitting structure 700 can be integrated with a skylight well 760 so that the desired ambient effect can be created during daylight 731 with no energy consumed. If desired, additional light sources 730 can be mounted in the well so that the effect can be attained after dark.

FIGS. 8 through 11 show some of the means of attaching the light transmitting elements to the opaque sheet. Other means of support not shown are also possible and do not affect the embodiment of the invention.

Figure 8:
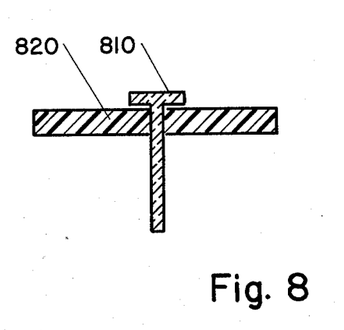
FIGS. 8 and 9 show sections illustrating two means of supporting the light transmitting elements.

In FIG. 8, the light transmitting elements 810 are inserted into slots in the opaque sheet 820. Because of the design of the elements in this instance, they will support themselves.

Figure 9:
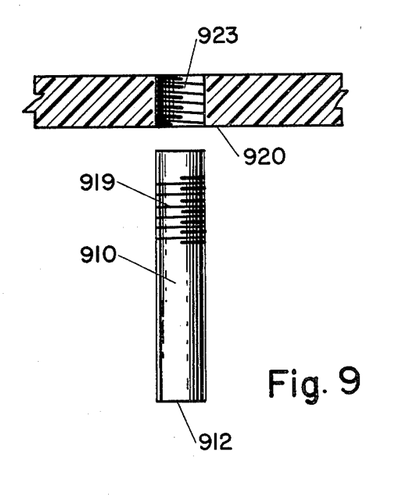

In FIG. 9, cylindrical rods 910 are the light transmitting elements. They are threaded 919 to fit into threads 923 in the opaque sheet 920. However, since threads constitute a roughened edge, some of the light entering the rods will be absorbed by the opaque sheet, reducing the amount of light emitted from the primary roughened edges 912.

Figure 10:
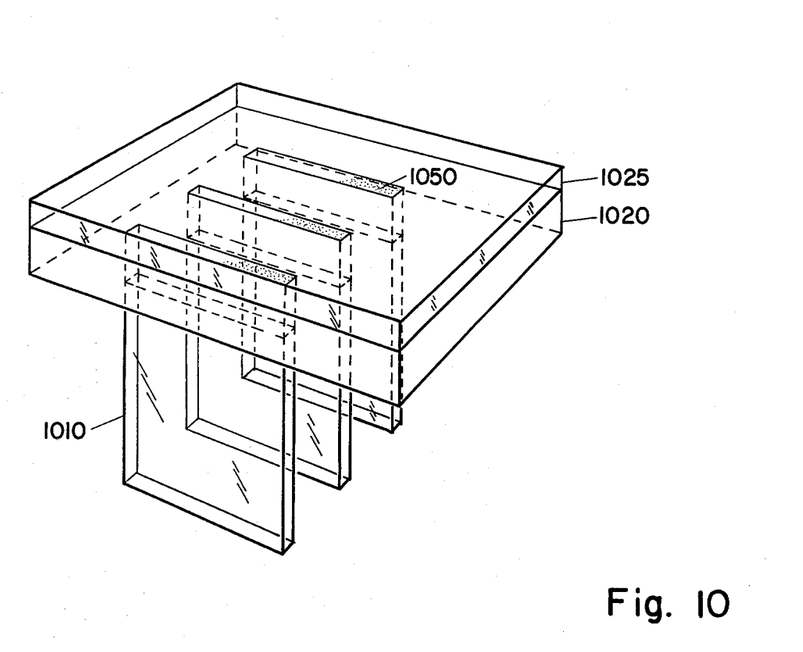
FIGS. 10 and 11 are perspective views illustrating two other means of supporting the light transmitting elements.
Figure 11:
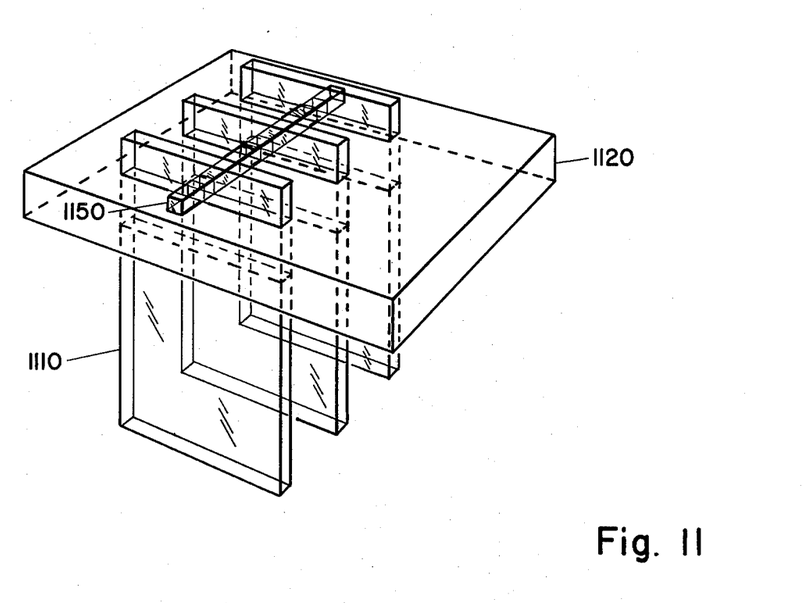

FIGS. 10 and 11 are perspective views from the light source side of the structure.

In FIG. 10, adhesive 1050 is used to adhere the light transmitting elements 1010 to the light emitting face of a transparent sheet 1025 between the opaque sheet 1020 and the light source (not shown).

In FIG. 11, rectangular dowels 1150 are inserted through the light transmitting elements 1110 between the opaque sheet 1120 and the light source (not shown). However, because the surface of the elements is broken, some light is lost, and this method of adhering the elements is not as energy efficient as others.

If the opaque sheet 1120 were poured as a liquid that hardens in a mold or in place after the light transmitting elements 1110 are inserted into it (not shown), the sheet itself can support the elements and no further means of support is necessary.

Having fully described the invention, it is intended that it be limited only by the scope of the appended claims.

I claim:

1. A light transmitting structure for use with a light source, said structure comprising at least one opaque sheet of a rigid material having a light source side and light emitting side; at least one of said opaque sheets having a plurality of separate light transmitting elements passing through it so that a first portion of each said light transmitting element is flush with or protrudes beyond said light source side of said opaque sheet, and a second portion of each said light transmitting element protrudes beyond said light emitting side of said opaque sheet; a plurality of said second portions having transparent faces, said first portions each having at least one polished edge and any number of roughened edges, said second portions each having at least one roughened edge and any number of polished edges; a plurality of said second portions passing through said opaque sheet being of varying dimensions so that a line of sight exists which passes through both a transparent face of at least one light transmitting element and a roughened edge of at least one other light transmitting element behind said transparent face.

2. The light transmitting structure of claim 1 wherein each said light transmitting element is perpendicular to the opaque sheet through which it passes, at their intersection.

3. The light transmitting structure of claim 2 wherein said light transmitting elements are polyhedrons.

4. The light transmitting structure of claim 2 wherein said light transmitting elements are flat panels.

5. The light transmitting structure of claim 4 wherein said light transmitting elements are made from an acrylic plastic.

6. The light transmitting structure of claim 5 wherein said light transmitting elements are of different colors.

7. The light transmitting structure of claim 5 wherein there is a pattern on said transparent face of at least one said light transmitting element so that said pattern is also illuminated.

8. The light transmitting structure of claim 5 wherein a transparent sheet is positioned between said first portions of said light transmitting elements and any light source that illuminates said first portions.

9. The light transmitting structure of claim 5 wherein said opaque sheet has at least one void in it so that light passes directly through said void as well as through said light transmitting elements.

10. The light transmitting structure of claim 5 comprising also an opaque housing attached to said opaque sheet in a light-tight manner with means inside said opaque housing for containing at least one light source.

11. A suspended modular ceiling having integrated therein at least one light transmitting structure of claim 5.

12. The light transmitting structure of claim 5 wherein said transparent faces are highly polished, whereby external reflections of light emitted from said roughened edges occur between said faces, and said reflections alter their positions as an observer alters his or her position with respect to said structure.

13. The light transmitting structure of claim 12 wherein said light transmitting elements are of different colors.

14. The light transmitting structure of claim 12 wherein a colored transparent sheet is positioned between said first portions of said light transmitting elements and any light source illuminating said first portions.

15. The light transmitting structure of claim 12 wherein said opaque sheet has at least one void in it so that light passes directly through said void as well as through said light transmitting elements.

16. The light transmitting structure of claim 12 comprising also an opaque housing attached to said opaque sheet in a light-tight manner with means inside said housing for containing at least one light source.

17. A suspended modular ceiling having integrated therein at least one light transmitting structure of claim 12.

* * * * *

UNITED STATES PATENT AND TRADEMARK OFFICE
CERTIFICATE OF CORRECTION

PATENT NO. : 4,223,374
DATED : September 16, 1980
INVENTOR(S) : Peter S. Kimmel

It is certified that error appears in the above—identified patent and that said Letters Patent is hereby corrected as shown below:

In the heading, correct the Inventor's address to read:

7405 Barra Drive
Bethesda, Md. 20034

Signed and Sealed this

Third Day of February 1981

[SEAL]

Attest:

RENE D. TEGTMEYER

Attesting Officer    Acting Commissioner of Patents and Trademarks